No. 757,420. PATENTED APR. 12, 1904.
W. R. SMITH.
WIRE CLIP FOR CUSHION SPRING WORK.
APPLICATION FILED JULY 24, 1902.
NO MODEL.

WITNESSES:
Wm. F. Doyle.
Harrie R. Brown.

INVENTOR
Watson R. Smith
BY Chester W. Brown
Attorney

No. 757,420. Patented April 12, 1904.

UNITED STATES PATENT OFFICE.

WATSON R. SMITH, OF JACKSON, MICHIGAN.

WIRE CLIP FOR CUSHION-SPRING WORK.

SPECIFICATION forming part of Letters Patent No. 757,420, dated April 12, 1904.

Application filed July 24, 1902. Serial No. 116,792. (No model.)

*To all whom it may concern:*

Be it known that I, WATSON R. SMITH, a citizen of the United States, residing at the city of Jackson, in the county of Jackson and State of Michigan, have invented certain new and useful Improvements in Wire Clips for Use in Spring-Cushion Work, of which the following is a specification.

The objects of my said invention are, first, to provide a means for connecting springs to each other and to their support, stay, and edge wires composed of a wire clip; second, to provide one that requires the minimum amount of wire, and consequently is light in weight; third, to provide one that has a shape that is readily made by automatic machinery, and consequently is low in cost, and, fourth, to provide one that is capable of use in all of the various positions required in a cushion, so that it is necessary to employ but one style, other objects and advantages being evident from the following description.

Figure 1:
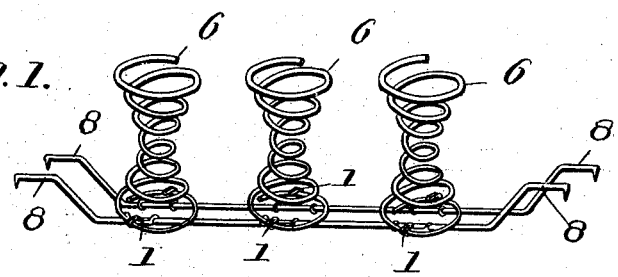
Figure 2:
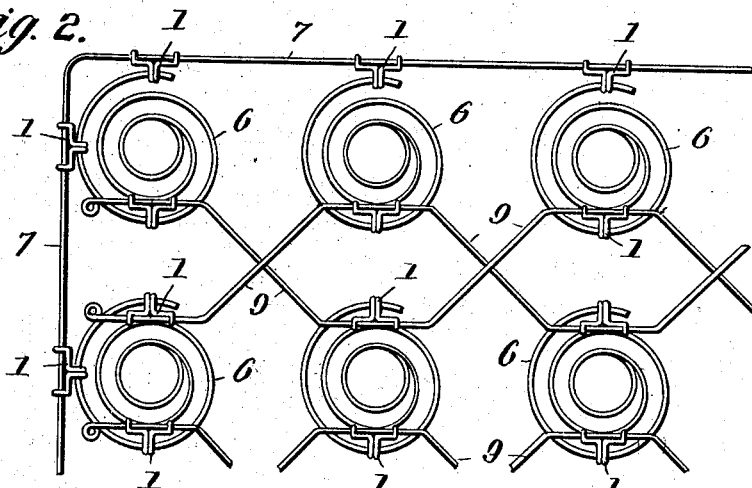
Figure 3:
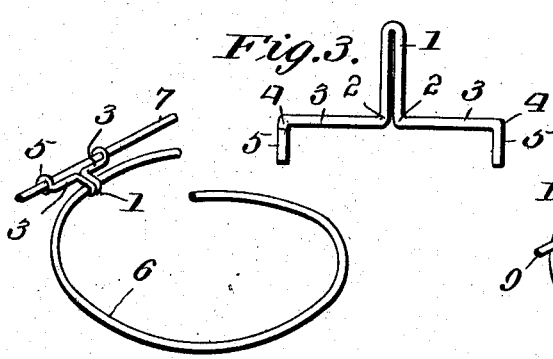
Figure 4:
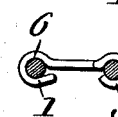
Figure 5:
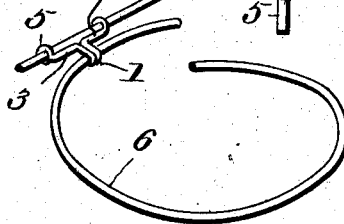
Figure 6:
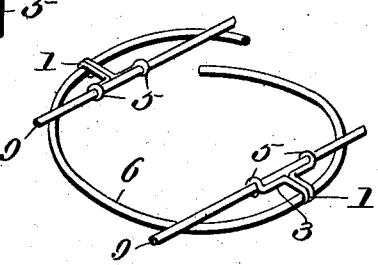

In the drawings forming a part of this specification, and in which similar figures of reference refer to like parts, Figure 1 is a perspective view of two support-wires for spring-cushions, having coiled springs attached thereto by means of my improved wire clips. Fig. 2 is a top plan view of a lounge or other spring-edge cushions showing the stay and edge wires attached to said springs by means of my improved clips. Fig. 3 is a detail view of the shape and formation of my said wire clip before being attached to said cushion-springs. Fig. 4 is an end elevation of said clip after being attached to the spring and edge wire. Fig. 5 is an enlarged perspective view of the top coil of a spring connected to an edge wire by means of my clip. Fig. 6 is an enlarged perspective view showing the manner of attaching the stay-wires to said springs in the construction shown in Fig. 2.

It has formerly been customary in nearly all cushion construction to attach the springs to one another and to the frame by means of cord or twine. In all such construction the cord soon wears out in use, the springs are then loose, and both provide a very defective cushion and tend to wear or punch through the covering. I have designed my wire clip to take the place of such cord in fastening such springs together, and thus prevent the springs from becoming unfastened or slipping about and becoming out of place.

In Fig. 1 I have shown one style of construction employing my said wire clips. In this construction two support-wires are employed for each row of springs, and their ends are adapted to be fastened to the wooden frame by driving the pointed ends therein or other suitable means. These support-wires are placed near enough to each other to permit the lower coils of the springs 6 6 to rest thereon, and said springs are then attached thereto and held in place by means of the wire clips 1 1. In this style of construction the springs are held rigidly in an upright position, and there is no need of tying the tops for ordinary cushions, and there is no liability of the springs becoming loose or out of place, as whatever pressure is applied thereon in use is received directly by the support-wires upon which they rest and no strain comes upon the clips which would in any manner tend to loosen or displace them. By employing my said clip in this style of construction I am enabled to make a very light, simple, and durable cushion and at a low expense.

In Fig. 2 I have shown the manner of attaching the springs to the edge wires and to the stay-wires in spring-edge-cushion work. To accomplish this style of work, the edge wire 7 is passed around the said cushion, and the top of each spring is attached thereto by means of one of my clips, as shown.

In Fig. 5 I have shown an enlarged view of a spring attached to the edge wire in the manner above described. Instead of this manner of attaching the spring to said edge wire it could equally as well be attached the same way as the stay-wires, as shown more particularly in Fig. 6. In this construction the edge wire would rest directly upon the uppermost coil of the springs forming the outer row and would be attached thereto by clips, as shown, Fig. 6. The said edge wire would then rest directly upon said outer row of springs, and any downward pressure thereon would tend directly to compress said springs and would be less liable to loosen or disconnect the clips from said edge wires and from said springs.

In Fig. 2 I have shown the stay-wires 9 9 attached to said springs by means of my said clips. These stay-wires may be of any suitable shape or construction demanded by the style of cushion being constructed and rest upon the topmost coils of the springs to which they are attached. By this construction whatever pressure is applied to the said stay-wires in use or to the top of said cushion is directly received by said springs and tends to compress the same. At the same time there is no strain or pressure having any tendency to loosen or displace the said wire clips. Instead of this form of connecting the stay-wires they may be attached to said springs in the manner shown for attaching the edge wires in Fig. 5, in which they would not rest upon the uppermost coils of said springs. For an all-wire cushion the lower coils of said springs may be connected to stay and edge wires in the same manner as shown for attaching the tops herein. To accomplish these ends, I have made my said clip of wire of suitable size to best answer the style of work required and of the shape as shown in Fig. 3. The arm or middle portion is bent into the form of a loop at 1, with the respective members or bight thereof in close proximity to one another. At the portions 2 2 the said wire is formed into an angle, as shown, producing the members 3 3, as shown, extending in opposite directions. At 4 4 these members 3 3 are bent again at an angle, forming the ends 5 5 of suitable length. To attach the springs to one another or to other wires, the portion 1, forming the loop in said clip, is closely coiled about one of the members to be connected, as shown in Fig. 4, and the ends 5 5 are tightly coiled about the other member to be connected thereto. By this construction it will be seen that I secure a double coil about each of the members to be connected and that the said respective coils are connected together by the loop at 1. By this construction I employ as little wire as can safely be used, and the bends are such that they can be readily and quickly formed by automatic machinery at low cost. In the process of manufacture the said clips will be formed with the coils in the loop 1 and in the ends 5 5 partially formed, so that all that is required is to place them upon the members about which they are to be coiled and compress them tightly thereabout by the proper tools. The loop 1 could be formed more open, thus leaving more space between the side members thereof; but I prefer the said members close together, as shown, as they grip the wire more firmly and there is less likelihood of the loop being spread farther apart by any strain applied thereto when they are thus close together and closely coiled about the wire to which they are attached. I prefer to make the loop 1 and the members 3 3 as short as can be conveniently employed, as they hold the spring and the edge or stay wires more firmly, there being less bend or spring in the wire the shorter it is, and the less wire is required, thus reducing both weight and expense; but it is apparent that the loop 1 may be made longer, if desired, and the spring will then be at a greater distance from the edge wire, and this distance may be increased or diminished, as desired, by altering the length of said loop 1.

Having thus described my invention, what I claim, and desire to secure by Letters Patent, is the following:

1. A clip for spring-cushion work, comprising a single piece of wire bent intermediate its ends to form oppositely-disposed parallel members, each member having a portion bent at a right angle thereto and then directed in the same plane as the aforesaid members to form a second set of spaced parallel members, each member of the first-mentioned parallel members having a portion bent back toward itself to form a single open hook, and each free end of the second-mentioned parallel members having a portion bent back toward itself to form a single open hook lying in the same plane as the member from which it is formed, all of said hooks lying in the same plane, and each hook capable of being brought into contact with the member from which it is bent.

2. In a spring-cushion, the combination with a frame, of springs arranged within the frame, stay-wires crossing each other in pairs between the springs and resting upon each diagonally opposite spring, and clips engaging the outer convolution of each spring and extending inwardly upon the spring for engagement with that portion of the stay resting thereupon.

3. In a spring-cushion, the combination with a frame, of springs arranged therein, stay-wires crossing each other in pairs and resting upon each diagonally opposite spring, and clips comprising a single piece of wire bent intermediate its ends to form oppositely-disposed parallel members, each member having a portion bent at a right angle thereto, and then directed in the same plane as the aforesaid members to form a second set of spaced parallel members, each member of the first-mentioned parallel members having a portion bent to form a single hook immediately therebeneath for engagement with one of said springs, and each free end of the second-mentioned parallel members having a portion bent to form a hook lying in substantially the same plane as said parallel members for engagement with that portion of the stay resting upon said spring.

In testimony whereof I have hereunto set my hand.

WATSON R. SMITH.

Witnesses:
A. W. TOWN,
CHESTER W. BROWN.